(12) United States Patent
Das et al.

(10) Patent No.: US 11,490,163 B1
(45) Date of Patent: Nov. 1, 2022

(54) CONTENT RECOMMENDATION BASED ON A SYSTEM PREDICTION AND USER BEHAVIOR

(71) Applicant: Rovi Guides, Inc., San Jose, CA (US)

(72) Inventors: Shyak Das, West Bengal (IN); Vikram Makam Gupta, Karnataka (IN); Muthukumar Lakshmipathi, Karnataka (IN); Madhusudhan Seetharam, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/370,620

(22) Filed: Jul. 8, 2021

(51) Int. Cl.
  *H04N 7/10* (2006.01)
  *H04N 7/025* (2006.01)
  *H04N 21/472* (2011.01)
  *H04N 21/466* (2011.01)

(52) U.S. Cl.
  CPC ... *H04N 21/47214* (2013.01); *H04N 21/4663* (2013.01); *H04N 21/4668* (2013.01)

(58) Field of Classification Search
  CPC ......... H04N 21/47214; H04N 21/4663; H04N 21/4668
  See application file for complete search history.

(56) References Cited

U.S. PATENT DOCUMENTS

| | | | |
|---|---|---|---|
| 7,761,892 B2 | 7/2010 | Ellis et al. | |
| 2015/0058264 A1* | 2/2015 | Hughes | G06F 16/637 706/12 |
| 2018/0174190 A1* | 6/2018 | Ferreira | G06Q 50/01 |
| 2018/0302677 A1* | 10/2018 | Patel | H04N 21/44224 |
| 2019/0173966 A1* | 6/2019 | Grokop | G06N 20/00 |
| 2021/0182697 A1* | 6/2021 | Singh | G06F 16/252 |
| 2021/0306688 A1* | 9/2021 | Bress | H04N 21/6582 |

OTHER PUBLICATIONS

Haiden, et al., "Intercomparison of global model precipitation forecast skill in 2010/11 using the SEEPS score," Technical Memorandum (2012) (23 Pages).
Kempa, "Machine Learning Algorithms for Football Predictions," Towards Data Science, (17 pages).

* cited by examiner

*Primary Examiner* — Mulugeta Mengesha
(74) *Attorney, Agent, or Firm* — Haley Guiliano LLP

(57) ABSTRACT

Systems and methods for generating a content item based on a difference between a user confidence score and a confidence score are disclosed. For example, a system generates for output a first content item. While the first content item is being outputted, the system receives user data via sensors of a device. The system determines a user confidence score based on the user data and metadata of the first content item. The user confidence score indicates a user's perceived probability of an event occurring in the future. The system calculates a prediction score which estimates the likelihood of the event occurring in the future. In response to determining that the difference between the user confidence score and the prediction score exceeds a threshold, the system selects a second content item related to the event and generates for output a recommendation comprising an identifier of the second content item.

20 Claims, 13 Drawing Sheets

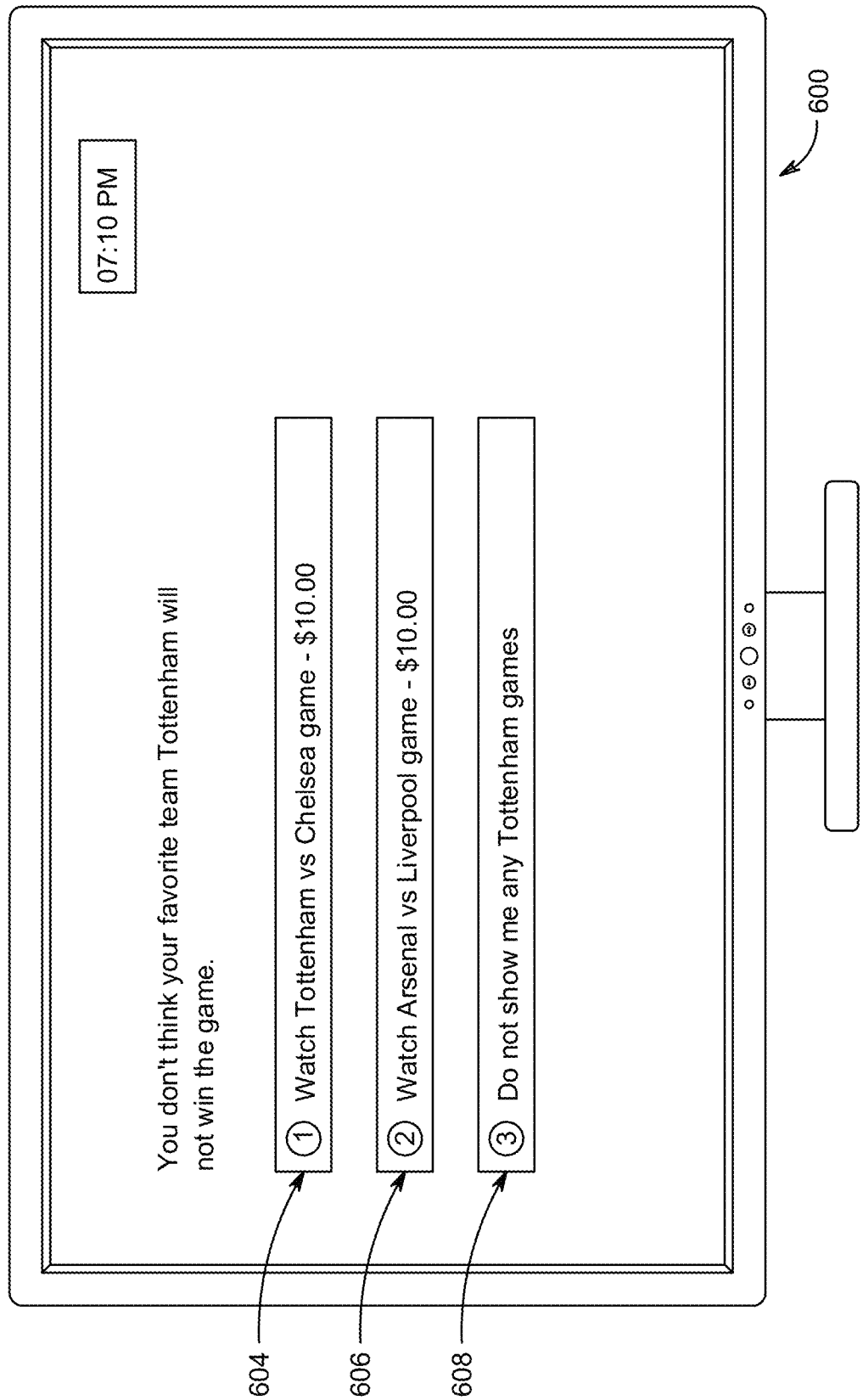

802

Generate for output a first content item on a device

804

While the first content item is being outputted, receive user data via one or more sensors of the device

806

Determine a user confidence score based on the user data and metadata of the first content item, the user confidence score indicating user's perceived probability of an event occurring in the future

808

Calculate a prediction score which estimates the likelihood of the event occurring in the future

810

Does the difference between the user confidence score and the prediction score exceed a threshold?

YES → 812

Select a second content item related to the event

814

Generate for output a recommendation comprising an identifier of the second content item

NO → 816

Select a third content item related to the event

818

Generate for output a recommendation comprising an identifier of the third content item

800  FIG. 8

CONTENT RECOMMENDATION BASED ON A SYSTEM PREDICTION AND USER BEHAVIOR

BACKGROUND

The present disclosure relates to the generation and timing of content recommendation and more particularly, generating content recommendation based on user behavior and a predicted outcome of an event in the near future.

SUMMARY

Many media services offer content recommendations for content items that may be consumed by a user. To provide such recommendations, in one approach, the media services utilize user behavior patterns or viewing history data. Such recommendations may be dependent on the data collected about a user over time (e.g., five days or three months) while the user is interacting with various content items.

This approach is deficient and ineffective in a situation where an outcome of an event plays an important part in the recommendation, such as a sports game, weather, expected scheduled event, etc. Because a recommendation based on accumulated data of users does not take into account the probability of an event occurring in the near future (e.g., team A winning a soccer match, rain occurring on a certain day), such recommendation may present inappropriate items (e.g., items that the user is not likely to consume) or present items at an inappropriate time (e.g., at a time when the user is not likely to consume the item). Presentation of inappropriate items or presentation of items at an inappropriate time needlessly consumes network and computational resources. Furthermore, the presentation of inappropriate items or presentation of items at an inappropriate time may clutter limited user interface and cover important information.

To address these problems, the methods and systems are described herein for providing content recommendation based on a difference between user behavior and a predicted outcome of an event. For example, a system generates for output a first content item (e.g., soccer match between team A and team B, weather forecast, etc.) on a device. While the first content item is being outputted, the system receives user data via one or more sensors of the device, such as a camera or a microphone, or via user interface of the system. The sensors may detect a user who is in proximity to the device and capture a user's audio, image, or video.

In some embodiments, based on the data received via sensors and/or user interface, the system determines a user confidence score which indicates a user's perceived probability of an event occurring in the future (e.g., a user predicts that the likelihood of team A losing the soccer match is 80%, a user predicts a 70% chance of rain today). For example, if the content item is a soccer match, if a user fiddles with a remote controller (e.g., input commands at an abnormally high rate) and gets distracted by surrounding objects (e.g., when user's gaze is directed toward objects other than the screen with the output of a content item), the system may determine that the user's perceived probability of team A winning the match is low. On the other hand, if a user's eye gaze is towards a display device for a long enough time (e.g., twenty minutes), then the system may determine that the user is very interested in the game and the user's perceived probability of team A winning the match is high. In some embodiments, a user confidence score may be determined based on the stored user data and metadata of the first content item (e.g., the user has indicated that the user is a fan of team A in the user profile and is optimistic about team A).

In another example, when a content item is a weather forecast, the system may calculate a user confidence score (e.g., user's perceived probability of rain is 80%) based on data received via sensors and/or user input received via a user interface (e.g., a poll asking a user's prediction on a weather condition). In some embodiments, a user confidence score may be determined based on user activity (e.g., a user checking the weather app every five minutes before going to work).

The system may calculate a prediction score that estimates the likelihood of the event occurring in the future (e.g., the system predicts that the likelihood of team A losing the soccer match is 50%). In some embodiments, the prediction score is not calculated based on the user behavior data, but the prediction score is calculated based on aggregated data about team A (e.g., Team A has been the MVP in the last five years). The system may generate a probabilistic model that predicts the likelihood of team A winning (or losing) in the sporting event based on training data, wherein the prediction score is calculated based on the probabilistic model that was, for example, trained using one or more machine learning algorithms.

In another example, when a content item is a weather forecast, the system calculates a prediction score based on data gathered about the current weather and the state of the atmosphere, such as temperature, pressure, or humidity. In one embodiment, a prediction score is calculated based on the probabilistic model (e.g., weather model) that is trained based on atmospheric factors. In another embodiment, the system receives prediction score information from a third party, such as a weather channel or a weather application.

In response to determining that the difference between the user confidence score and the prediction score (e.g., the user thinks the likelihood of team A losing the game is 80% and the system's prediction score is 50%) exceeds a threshold (e.g., 20%), the system selects a second content item related to the event (e.g., soccer match of team A v. weaker opponent than team B). The second content item may be a content item that the user is likely to be interested in consuming taking into account how the game is being played out. The system accesses a database of content items that includes at least data related to the current soccer game, data related to team A, or data related to team B. The second content item may be retrieved from the database of content items. The system generates for output a recommendation comprising an identifier of the second content item. The system may present one or more user-selectable options associated with the second content item for display. The options may include recording, watching, purchasing, bookmarking, adding to the watchlist, or sharing. The enumerated options are not exclusive and may include other selectable options.

In a related example, if the difference between the user confidence score and the prediction score (e.g., the user thinks the likelihood of team A losing the game is 5% and the system's prediction score is 20%) does not exceed a threshold (e.g., less than 20%), then the system may select a third content item, different from the second content item, such as season highlights of team A. For example, since the user thinks that team A is going to win the game and, therefore, the user is likely to consume more of team A's content items because the user is satisfied with team A. The system may recommend a content item such as season highlights because the user may be loyal to team A at this moment due to team A's excellent performance.

In another example, if the difference between the user confidence (e.g., high chance of rain) and the prediction score (e.g., low chance of rain) exceeds a certain threshold, the system may offer one or more content items for a recommendation. For example, the system may offer a content item to watch at home (e.g., movie rental) because the user may stay home thinking that it is going to rain. The system may offer an umbrella for purchase because a user's perceived probability of rain is high.

In some embodiments, the timing of providing a recommendation is critical due to the ever-changing aspect of the event (i.e., sports game). For example, team A is doing well during the soccer match until a star player gets injured. The star player has shown such a great performance that the user predicts that team A will no longer win the game without the star player. Thus, when a user confidence score is determined, the system determines the time of when the user confidence score is determined. Generating the third content item for recommendation (e.g., season highlights) depends on when the user confidence score is determined. For example, the system will generate the third content item for a recommendation only for a certain period of time from when the user confidence score was determined. If the time is longer than a threshold time (e.g., five minutes), the system may no longer recommend the second item for a recommendation since the user's perceived probability of team A may change over time and may get closer to the systems' predicted outcome (which is often more accurate).

In some embodiments, if the system does not receive any input selecting the recommended second item, the system may select a fourth content item different from the second item and present the fourth content item for a recommendation. For example, if a user does not select the season highlights of team A for over five minutes (i.e., the user's loyalty towards Team A is not big enough to watch season highlights or the season highlights are priced too high for the user), then the system may offer a different content item that may still be relevant to team A (e.g., a soccer match of team A v. team C) to attract the user who has shown some form of interesting team A.

The present disclosure addresses the problem of recommending content that does not take into account a changing aspect of an outcome of an event by, for example, 1) predicting a user's perceived probability of an event occurring in the near future; 2) calculating a prediction score of the likelihood of the event occurring in the near future; and 3) generating a recommendation based on a difference between the predicted user's perceived probability and the prediction score. The present disclosure saves network bandwidth and reduces network traffic by not transmitting unrelated or irrelevant content items to users and maximizes the chances of recommended content being consumed. The present disclosure also saves processing power and computer resources by not requesting or downloading content that may not be consumed by users.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 6A and 6B are exemplary user interfaces for providing content recommendation related to a sporting event, in accordance with some embodiments of the disclosure;

FIG. 8 depicts an illustrative process for providing content for a recommendation, in accordance with some embodiments of the disclosure;

DETAILED DESCRIPTION

Figure 1:
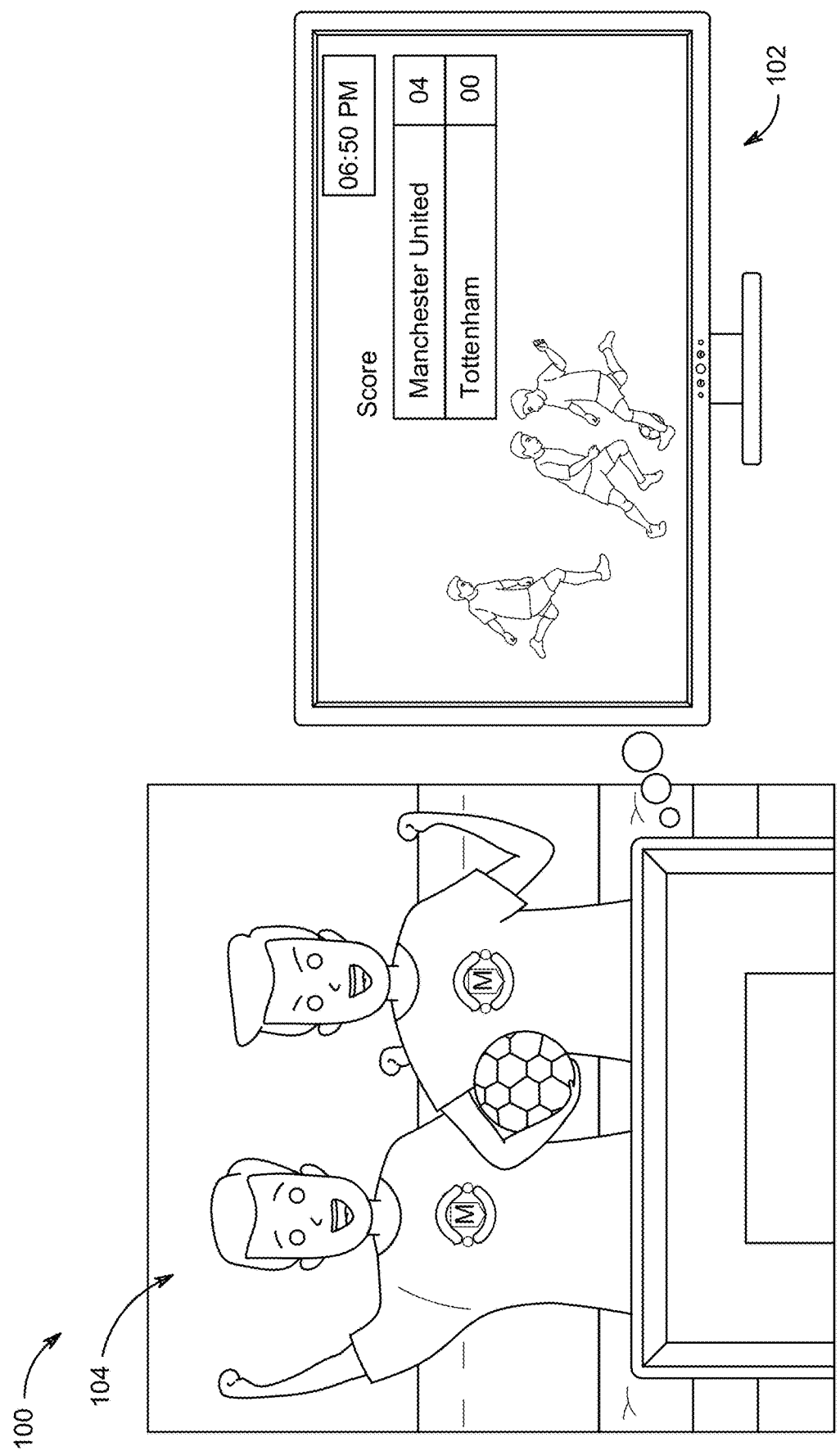
FIG. 1 shows an example content instantiation that shows a content item that is played on a device, in accordance with some embodiments of the disclosure.

FIG. 1 shows an example content instantiation 100 that shows a content item (e.g., soccer match) that is played on a device, in accordance with some embodiments of the disclosure. Although FIGS. 1-7 depict the user device as a television, it will be understood that any suitable device for displaying a live stream or a video-on-demand may be used, such as user television or gaming equipment 914*a*, user computer equipment 914*b*, or wireless user communications device 916*c* discussed below in relation to FIG. 9. The user device in FIG. 1-7 may have control circuitry 1002, 1010 of FIG. 10 configured to request a content item from a server for display (e.g., on a display such as display 1020 discussed later in more detail with reference to FIG. 10). FIGS. 1-7 depict improved user interfaces that include exemplary content instantiation, which illustrates content recommendation operations.

As shown in FIG. 1, a media application implemented on a user device 102 requests an audio-visual media asset that includes a group of segments. It will be understood that, consistent with the present disclosure, any content item may be requested for streaming from the media server. As referred to herein, the term "content item" should be understood to mean an electronically consumable user asset, such as an electronic version of a printed book, electronic television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, articles, newspapers, blogs, links, advertisements, chat sessions, social media, applications, games, and/or any other media or multimedia and/or combination of the same.

As shown in FIG. 1, a content item (e.g., soccer game, weather forecast, news, etc.) is streamed on user device 102 via the media application. The media application may be a stand-alone application implemented on the user device. User device 102 may detect users 104 who are in proximity to the user device. For example, one or more sensors of the device, such as a camera 1024 or a microphone 1026 of FIG. 10, may capture an image or a video of users who are within a threshold distance from the device and send the captured data to the media application. User device 102 may also capture user interface inputs. The media application may analyze the user data to determine a user's confidence score of an event occurring in the content item. A user confidence score may indicate a user's perceived probability of an event occurring in the future. In this example, the event indicates the likelihood of Manchester United winning the game. Although an event was used in the context of a sporting event, an event may be any kind of occurrence that can happen in one or more ways, such as a fictional event, episode of a TV series, weather phenomena, scheduled event, or news.

Based on the image captured via a camera of user device 104, the media application determines that the users 404 are wearing a Manchester United uniform as shown in FIG. 1. The media application may also determine from user profile data that users 404 are Manchester United fans. Based on the image captured via a camera of user device 104, the media application may determine that the users 404 have not moved from their seats for an extended period of time (e.g., twenty minutes) and have not changed the channel for an extended period of time. Based on the user data, the media application determines that users 404 are highly tuned to the content item (e.g., a soccer game) and infers the users' high optimism in their team Manchester United winning the game.

The media application may calculate a user confidence score based on the metadata of the content item, such as a title of the match, a player who is playing in the game, and the score information. For example, the score difference between Manchester United and Tottenham is 4:0. Because users 404 are wearing the Manchester United uniforms and Manchester United is winning by four points, the media application may determine that the users' perceived probability of Manchester United winning the game is high due to the high optimism for their team.

In some embodiments, the media application receives vocal input from a microphone of the device. For example, the conversation between users 104 may be analyzed to determine the user's confidence score based on the terms or keywords that were used by users 404, e.g., the frequency of a certain team name appears in a period of time. For example, if users 404 mentions the name "Manchester United" or a certain player's name in Manchester United often (e.g., three times in two minutes), the media application may determine that a user score (e.g., a user's perceived probability of Manchester United winning the game) is high. Similarly, the vocal tone (e.g., high pitch such as above 100 Hz) and excitement level can be determined and may be used as a basis for calculating a user confidence score. To analyze the vocal input, any natural language processing techniques may be used.

In some embodiments, a confidence score is calculated based on a user engagement level with a content item. For example, if a user fiddles with a remote controller (e.g., providing three input commands per minute) and gets distracted by surrounding objects, the media application may determine that the user's engagement level in the content item is low, and the user is pessimistic about their team winning. On the other hand, if a user's eye gaze is towards a display device for a long time (e.g., twenty minutes), then the media application may determine that the user is interested in the content item and infer user's optimism of the team winning.

In some embodiments, the media application receives user's biometric data from a wearable device associated with the media application. For example, a wearable device (e.g., smartwatch) may detect the change of heart rates when Manchester United scores (e.g., 70 beats per minute to 100 beats per minute) or when Manchester United are doing well. As such, the change of biometric data is transmitted to the media application, and the media application may associate the change of heart rate to the scoring of Manchester United. Based on the association, the media application infers that users 104 are Manchester United fans and determines that the user's perceived probability of Manchester United winning the game is high. In some embodiments, user's emotions, opinions, betting history, or investment history are used in determining user's confidence level in an event occurring in the content item. Any betting history or investment history may be retrieved from user profile data or a third-party database (e.g., betting application).

Figure 2:
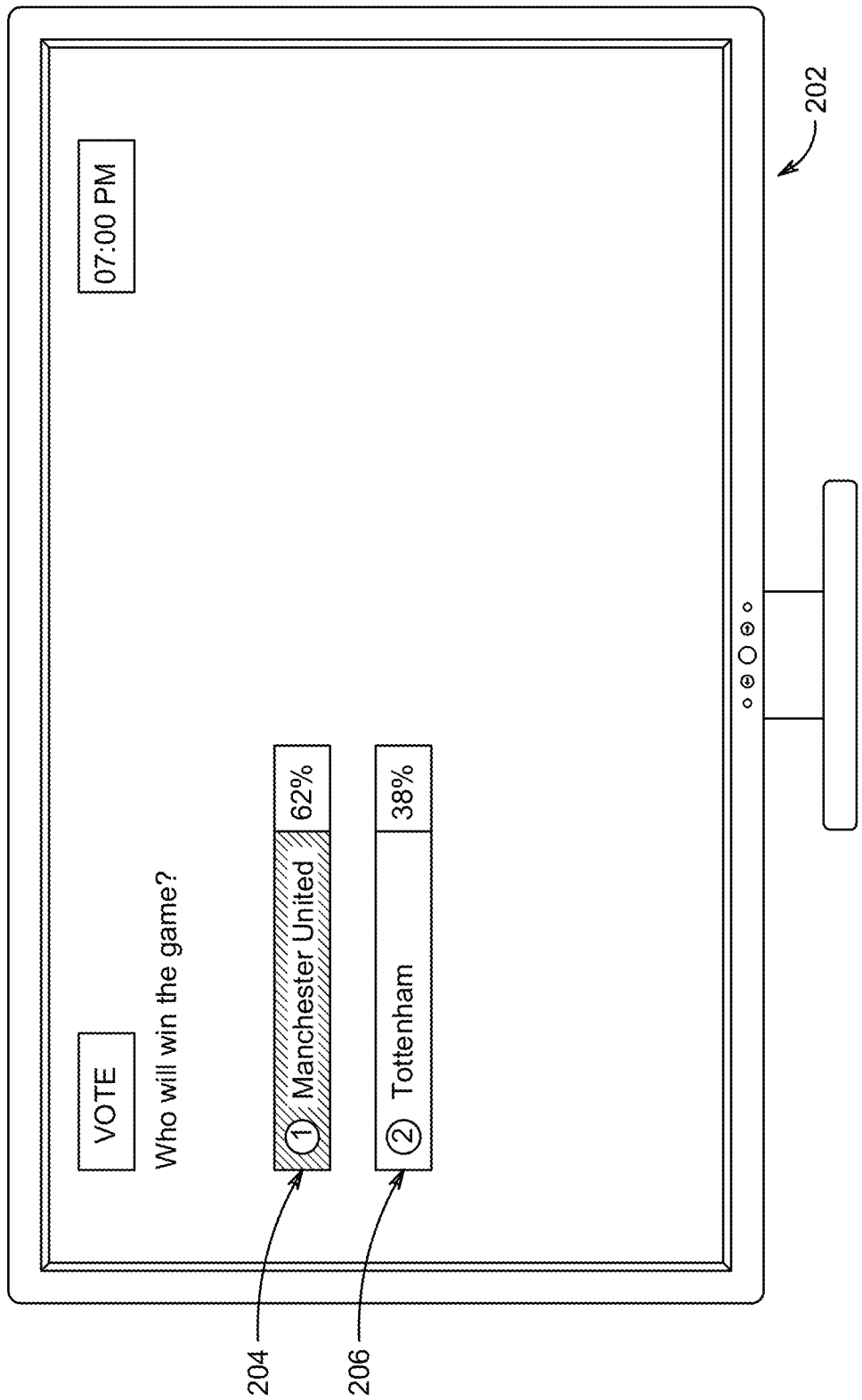
FIG. 2 is an exemplary user interface of soliciting user input for a poll response on a device, in accordance with some embodiments of the disclosure.

FIG. 2 is an exemplary user interface 200 soliciting a user input for a poll response. The media application may determine a user's confidence score based on explicit user input in addition to the user data. The media application may solicit poll responses 204, 206 from the user and prompt a user to select an answer to a poll question "Who will win the game?" during the match or before the match. The poll may be presented with a question ("How sure are you?") on a scale from zero to ten to measure an accurate user prediction. The media application determines that the answer to the question represents the user's perceived probability of an event (e.g., team A winning) and uses the poll response as a basis when calculating the user confidence score.

In some embodiments, the media application may use data from social media networks when determining the user confidence score. For example, the media application may query the database of social media networks and retrieve event-related data, such as a post or a comment that mentions a certain player, a match, or a team. Based on the content of the post or comment retrieved from the database of social media networks, the media application may determine a user's confidence score in a certain team, a player, or a match. In a related example, user's betting history or investment history for the team may be used to calculate the confidence score.

As described above, a user confidence score may be calculated based on one or more factors, such as data received via sensors of a device, metadata of a content item, user profile data, user biometric data received from a wearable device, user engagement level, etc.

One exemplary formula in calculating a user confidence score is:

$A$ user confidence score=$\alpha$*(user data)+$\beta$*(metadata of a content item)+$\gamma$*(user profile data)+$\delta$*(user biometric data)+$\zeta$*(user engagement level)+$\eta$*(explicit user input)

where $\alpha, \beta, \gamma, \delta, \zeta, \eta$ are different constant

Taking the exemplary formula for a user confidence score, one exemplary calculation of a user confidence score is =$\alpha$ (e.g., 0.5)*(user data is 3 because the user has mentioned the team name three times in the last five minutes)+β (e.g., 0.4)*(metadata of a content item is 4 because the score difference of the two teams is 4)+γ (e.g., 0.3)*(user profile data is 1 because a user has indicated that the user is a fan of Manchester United)+δ (e.g., 0.2)*(user biometric data is 30 because the heart rate has changed from 70 to 100)+ζ (e.g., 0.1)*(user engagement level is 20 because the user eye gaze for 20 minutes)+1 (e.g., 0.6)*(explicit user input is 0.62 because the user indicated in the poll that likelihood of their team winning is 62%)

The media application may repeat the above calculation process at different times of the game to get more data and train models to become more accurate in deducing the user's confidence score.

The media application also calculates a prediction score that estimates the likelihood of an event occurring in the future (e.g., the media application predicts that the likelihood of Manchester United losing the soccer match is 50%). In some embodiments, the prediction score is not calculated based on the user behavior data, user's emotions or thoughts, but the prediction score is calculated based on aggregated data about Manchester United (e.g., Manchester United has been the MVP in the last five years). The media application may generate a probabilistic model that predicts the likelihood of Manchester United winning (or losing) in the sporting event based on training data such as facts, history, and mathematical data about Manchester United.

The prediction score is trained and calculated in real time based on the probabilistic model using one or more machine learning algorithms. For example, the system may untie prior results, team and play ratings, game state and other data to predict an outcome of the match. Systems and methods for predicting the outcome of a sporting event are discussed in greater detail in Hucaljuk, et al, "Predicting football scores using machine learning techniques," https://towardsdatascience.com/machine-learning-algorithms-for-football-prediction-using-statistics-from-brazilian-championship-51b7d4ea0bc8, 2011 Proceedings of the 34th International Convention MIPRO, which is hereby incorporated by reference herein in its entirety. In some embodiments, similar models may be used to predict other events.

Figure 3:
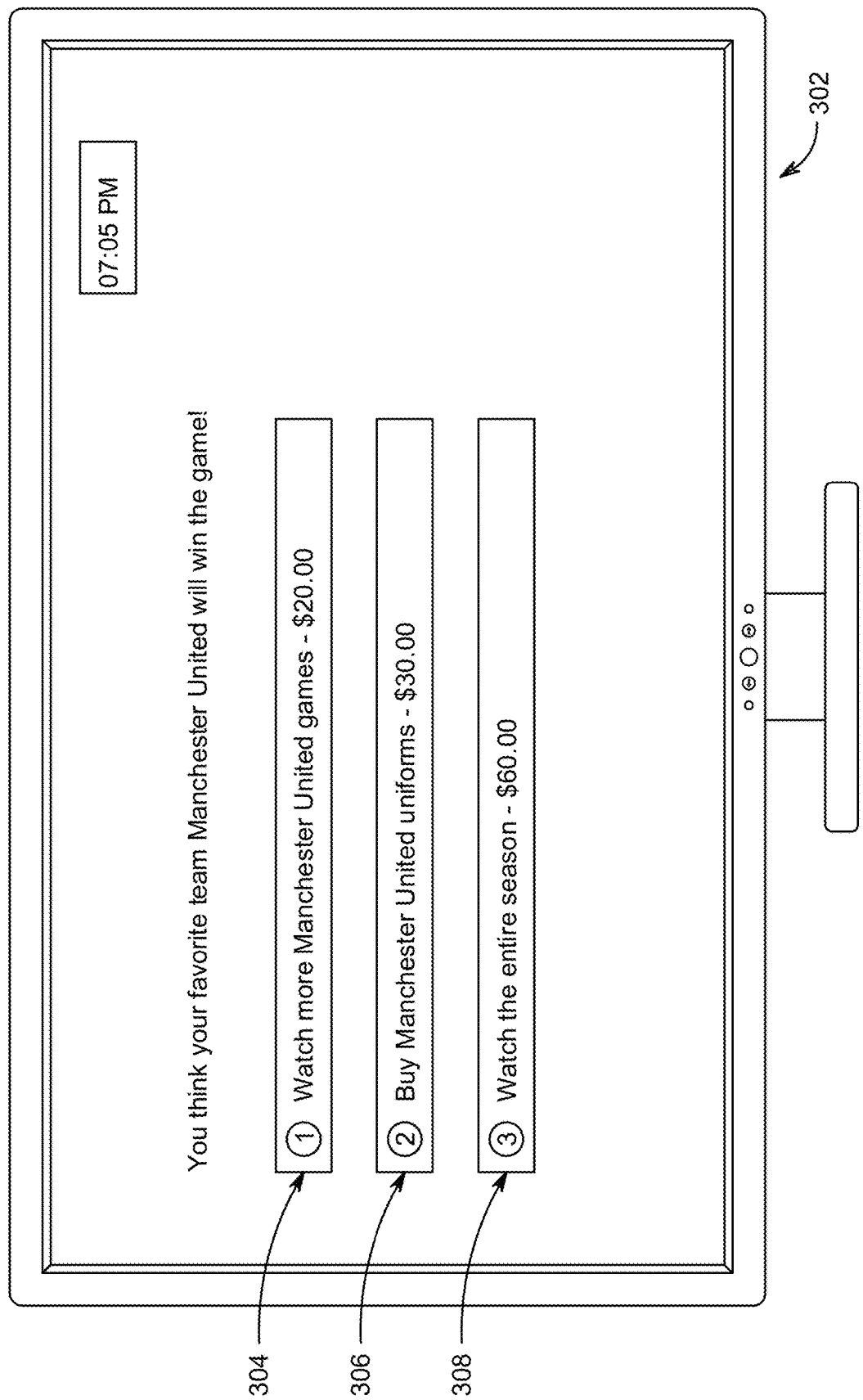
FIG. 3 is an exemplary user interface of providing a content recommendation, in accordance with some embodiments of the disclosure.

FIG. 3 is an exemplary user interface 300 for providing a content recommendation, in accordance with some embodiments of the disclosure. The media application operates based on the difference between the human perception of an event and a system's predicted outcome when selecting a content item for a recommendation. For example, the media application first determines the difference between the user confidence score and the prediction score. Depending on a value difference, the media application generates for output different content items for a recommendation.

In this example, based on the value difference, the media application selects a second content item related to the event for a recommendation. A second content item may be selected if the difference between the user confidence score and the prediction score exceeds a threshold value. A second content item related to the event may include any content item, product, object, packages, and action related to the event, such as viewing another content item, purchasing another content item, purchasing a swag related to a content item, or posting a comment related to a content item. It will be understood that the list of the event may include any content item.

Assuming a user's confidence score of Manchester United winning the game is 80% and a media application's prediction score is 50% in this example, the media application presents on user device 112 a larger VOD Package containing viewing rights of more of Manchester United games. For example, the media application may recommend an entire season 308 or more Manchester United games 304 as a recommendation. Because users 104 are satisfied with Manchester United, the media application may recommend merchandise about the content item such as the team uniform 306 as a recommendation.

In some embodiments, a threshold value may be modified based on a user or user's behavior. The media application may monitor the user behavior and modifies the threshold value accordingly, such as changing the upsell prices and creating more packages, products, or actions. This way, the media application does not abuse the recommendation system and yet, recommends items that are relevant to the user at that moment. The media application may change a recommended set of content items if the user does not buy any initially recommended content items. The below table illustrates an exemplary tabular format of different thresholds and recommendations for users.

TABLE A

Exemplary tabular format of different thresholds per viewer and recommendations
ViewerA:

| Value difference | Products/Actions | Upsell price |
| --- | --- | --- |
| +30% | Fav team Vod Package | $30 |
| −30% | Other team Vod Package | $10 |
| +60% | Entire season | $60 |

A recommendation presented to a user may be timebound. Because users 104 believe that their favorite team is playing well and hence, there is a higher chance of users 104 buying the VOD Package containing their favorite team. Generating for display this recommendation to a user at this time is important because a user's perception may change over time. A winning chance prediction may change every minute as the game progresses. Often, the user's confidence score gets closer to the system's prediction (e.g., converge) towards the end of the game because the system's prediction score is highly trained, and hence, often more accurate, without including human factors, such as human emotions. In some embodiments, making the recommendation timebound provides the added impulse for the user to make the purchase, such as including a time limit for accepting the recommendation (e.g., watch the entire season for only $60-five minutes left for this offer!)

Figure 4:
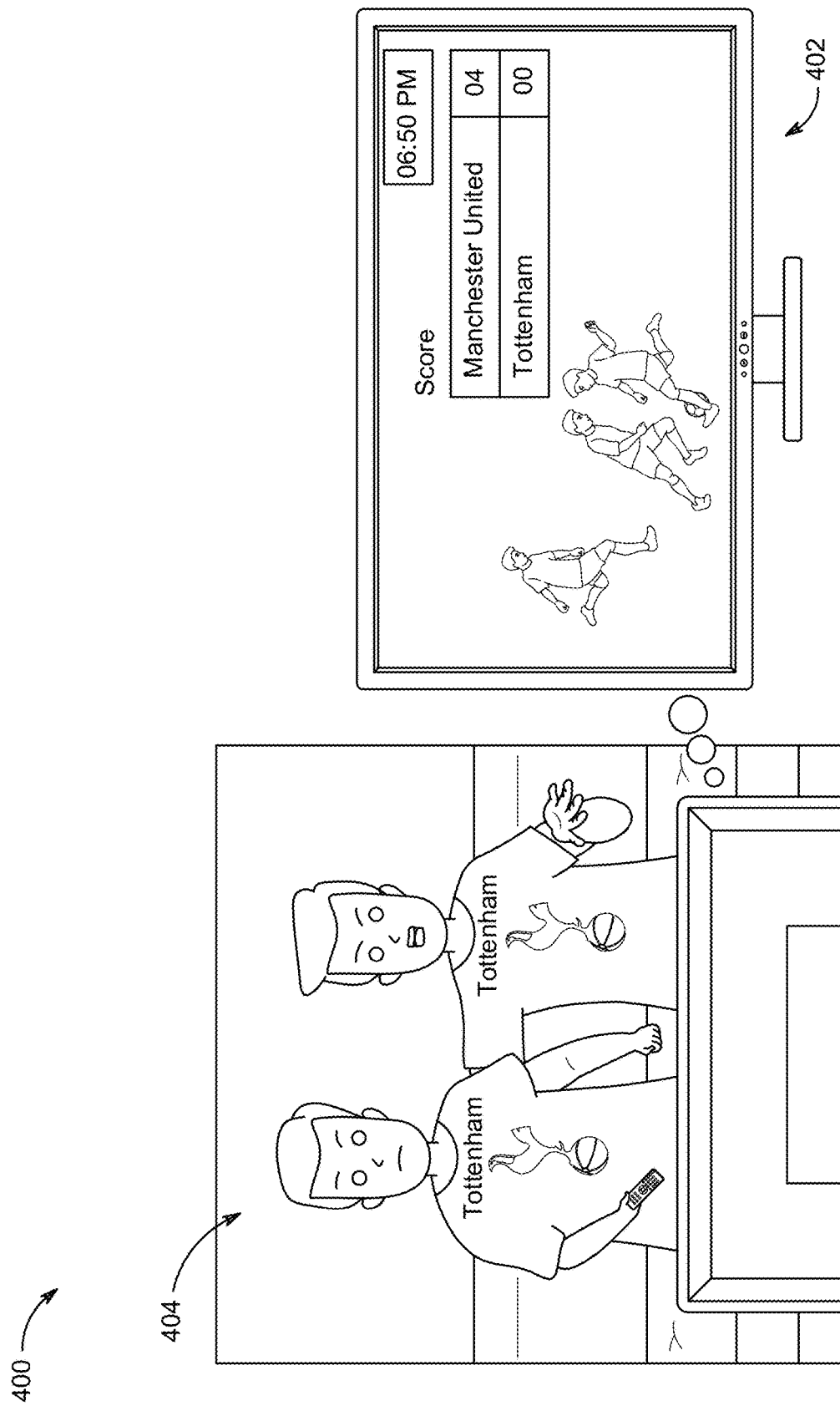
FIG. 4 shows example content instantiation that shows a content item that is played on a device, in accordance with some embodiments of the disclosure.

FIG. 4 shows an exemplary content instantiation 400 that shows a content item (e.g., soccer match) that is played on a device, in accordance with some embodiments of the disclosure. Unlike FIG. 1, users 404 are not satisfied with their favorite team, Tottenham. For example, one or more sensors of the user device may detect that the users are getting easily distracted (e.g., changing channels, fiddling with the remote buttons, changing seats, users are generally busy with other things, or just switching off the tv). Because users have lost interest in the game, the media application may determine that a user confidence score at 6:50 pm is 70% (e.g., team Tottenham losing the game).

In some embodiments, the media application calculates a prediction score based on a probabilistic model based on training data of Tottenham and using one or more machine learning algorithms. For example, based on the Tottenham players and Manchester United players' performances and how the game is played out, the media application calculates a prediction score to be 50% despite the fact that Tottenham is losing the game by four points as shown in exemplary user interface 402.

Figure 5:
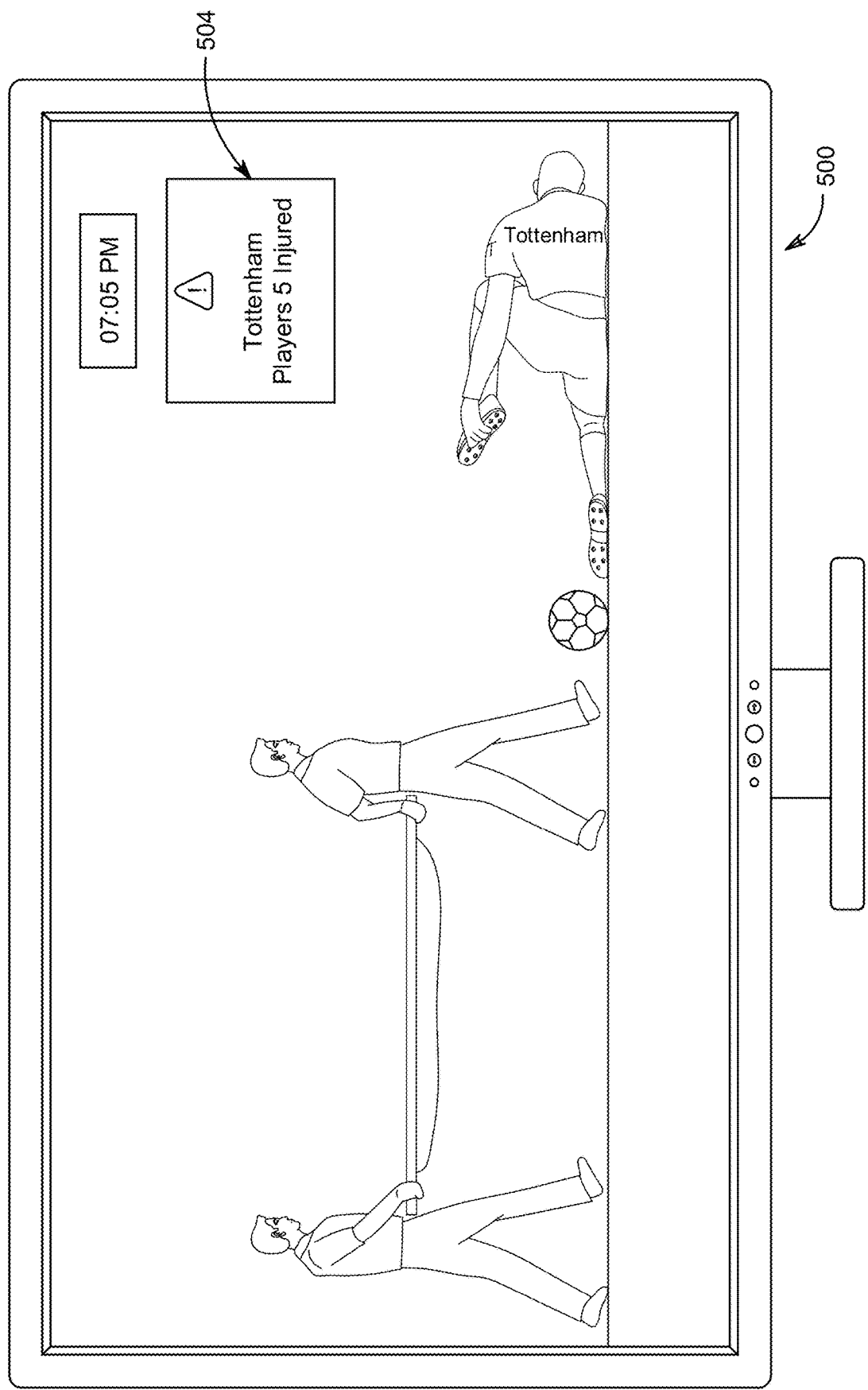
FIG. 5 is an exemplary user interface of a soccer player getting injured, in accordance with some embodiments of the disclosure.

FIG. 5 is an exemplary user interface 500 of a soccer player getting injured, in accordance with some embodiments of the disclosure. As shown in exemplary user interface 500, Tottenham player 5 is injured 504 and is no longer able to play the game. Immediately after the injury, users 404 believe that Tottenham is going to lose the game with a high chance of 90% due to a star player (e.g., player 5) getting injured 504 at 7:05 pm. However, the media application determines that a prediction score of Tottenham losing the game is still 50% based on the facts and game history data about Tottenham even after player 5 is getting out of the game. The media application may calculate a user confidence score and a prediction score immediately after a certain event has happened in the game (e.g., player injury or getting kicked out of the game).

FIG. 6A is an exemplary user interface 600 for providing content recommendation in connection with FIG. 5, in accordance with some embodiments of the disclosure. As shown in user interface 400 and 500, since users 404 believe their team, Tottenham, is going to lose with a high chance of 90% due to their favorite player getting injured, the discrepancy between the user's confidence score (e.g., 90%) and the system's prediction score (e.g., 50%) is high (e.g., around 40%). The high discrepancy may have resulted from the high pessimism of the user who has a strong belief in star player 5. When the difference between the user confidence score and the prediction score exceeds a threshold value (e.g., 20%), the media application may present to the user an offer of a third content item as a recommendation. As shown in exemplary user interface 600, an exemplary third content item is presented in a user interface of the device: "Watch Tottenham vs. Chelsea game" 604; "Watch Arsenal v. Liverpool game" 606; "Do not show me any Tottenham games" 608.

For example, "Watch Tottenham vs. Chelsea game" 604 may include a game between their favorite team, Tottenham, and a weaker opponent (e.g., Chelsea) than the current opponent (e.g., Manchester United). "Watch Arsenal vs. Liverpool game" 606 includes a soccer game of different teams but does not include Tottenham as a playing team because the user may have lost all the hopes of their favorite team. The VOD package of Arsenal vs. Liverpool price may be increased because the users are so disappointed that they may decide to buy a VOD package of a different team. This different team may be a team that is doing better than the user's favorite team. Exemplary user interface 600 may present "Do not show me any Tottenham games" 608 because the user is disappointed that the user does not want to view any Tottenham games anymore. In some embodiments, the media application may shrink the VOD package and show a lesser number of Tottenham games since users 404 may not buy a larger package as they are pessimistic of their team. These are one set of exemplary content items that can be recommended based on the difference between the confidence score and the prediction score. Any combination or a set of content items may be presented as a recommendation.

Figure 6B:
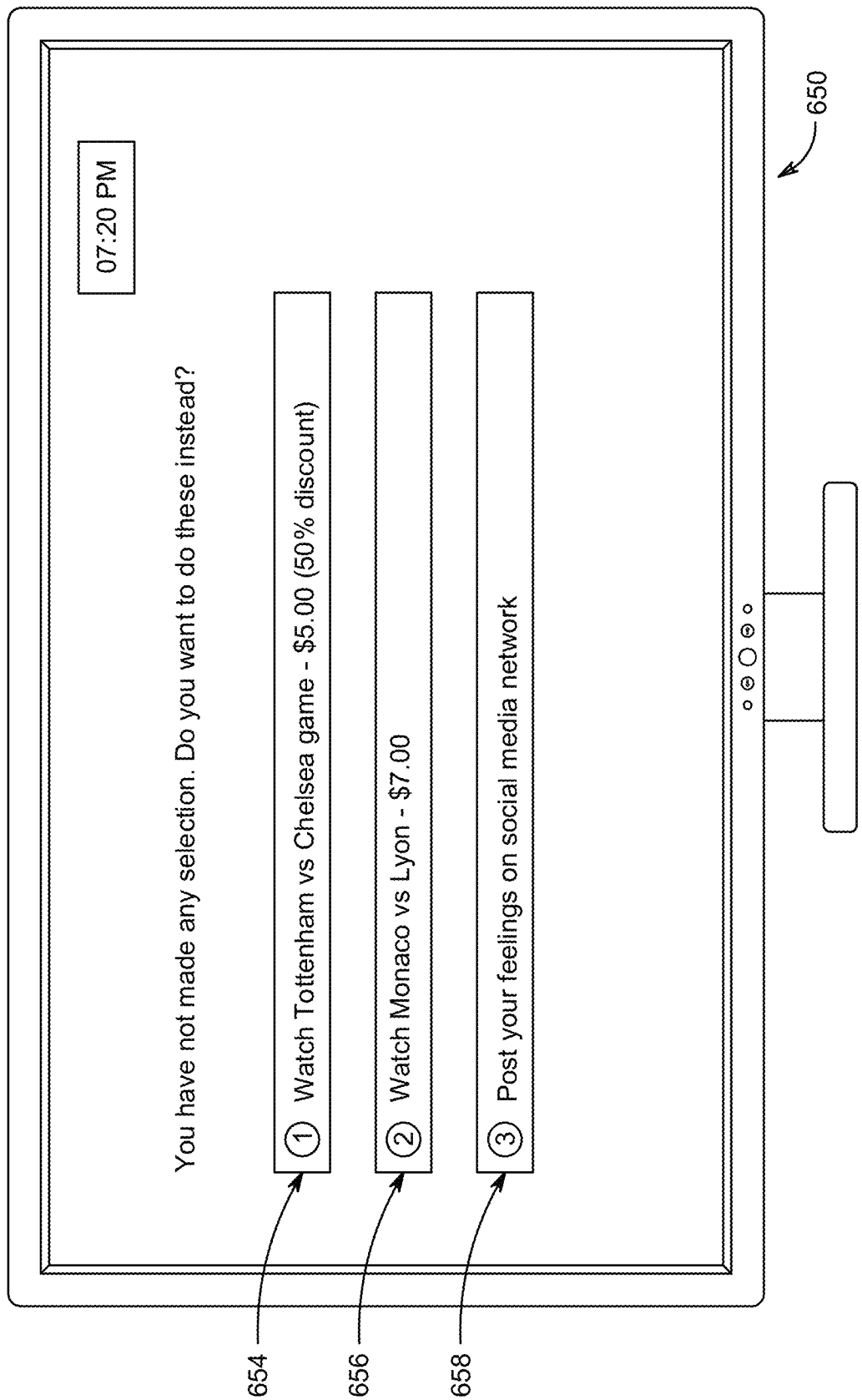

FIG. 6B is an exemplary user interface 650 for providing content recommendations in connection with FIG. 6A, in accordance with some embodiments of the disclosure. If a user does not make any selection for a certain period of time (e.g., ten minutes) from when exemplary user interface 600 is presented, another exemplary user interface 650 is generated for output on a user device. As shown in FIG. 6B, another set of content items may be presented for user selection. For example, an exemplary user interface 650 includes "Watch Tottenham v. Chelsea game" 654 or "Watch Monaco vs. Lyon game" 656. Tottenham v. Chelsea game" 654 may be offered at a lower price than the originally offered price (previously, offered for $10) since the media application determines that the user is not willing to pay $10 for the game. Another content item 656, different from the Arsenal vs. Liverpool game 606, may be offered because the user has not shown interest in any of the previously presented teams. The newly presented teams may be teams that have never been recommended before. In some embodiments, exemplary user interface 650 may include a link to post or comment on the social media network associated with a user 658. For example, a user may upload a comment or write on the feed to share the experience with other users. Although FIGS. 6A-6B depict certain types of content recommendation, it will be understood that any suitable content recommendation methods, such as weather recommendation or news recommendation, may be used.

In some embodiments, the media application may recommend different content items to different users. For example, if Manchester United fans 104 and Tottenham fans 404 are watching the soccer match together, the media application may receive data for all of the users. The data for each user may result in different confidence scores for the event because each of the users has different optimism levels for their teams. For example, while watching the same game, Manchester United fans 104 may have a confidence score of 70% (e.g., the team Manchester United winning the game), but Tottenham fans 404 may have a confidence score of 30% because they are rooting for different teams, and have different views and opinions on how the game will end. In this case, the media application may recommend different content items for different users. For example, the media application may recommend content items 304, 306, 308 to Manchester United fans 104 on a display device associated with Manchester United fans 104, and may recommend content items 604, 606, 608 to Tottenham fans 404 on a display device associated with Tottenham fans 404 while the same game is consumed by both users 104, 404. In some embodiments, the media application may take an average score of the confidence scores for each user when determining a global confidence score for all of the users.

Figure 7A:
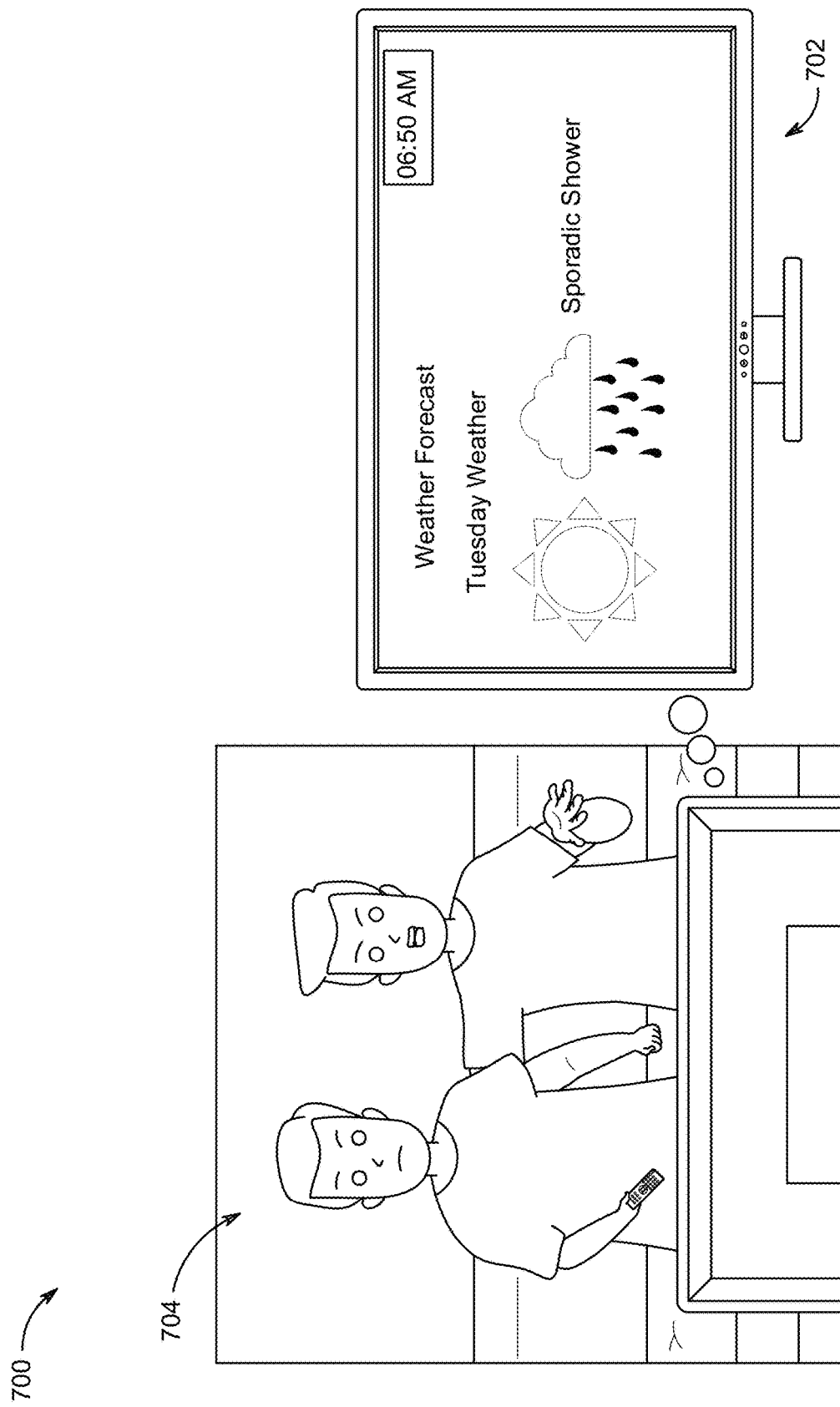
FIGS. 7A, 7B, and 7C are exemplary user interfaces for providing content recommendation related to a weather forecast, in accordance with some embodiments of the disclosure.

FIG. 7A shows an exemplary content instantiation 700 that shows a content item that is played on a device, in accordance with some embodiments of the disclosure. For example, when a content item is a weather forecast 702, the media application calculates a prediction score (e.g., the probability of precipitation) based on data gathered about the current weather and the state of the atmosphere, such as temperature, pressure, or humidity. In some embodiments, a prediction score is calculated based on the probabilistic model (e.g., weather model) that is trained based on atmospheric factors. Systems and methods for predicting the weather are discussed in greater detail in Haiden T, et al., "Intercomparison of global model precipitation forecast skill in 2010/11 using the SEEPS score," https://www.ecmwfint/en/elibrary/9732-intercomparison-global-model-precipitation-forecast-skill-2010-11-using-seeps-score, Technical Memorandum Number 665, European Centre for Medium-Range Weather Forecasts 2012, which is hereby incorporated by reference herein in its entirety. In some embodiments, the media application receives prediction score data from a third-party source, such as a weather application or a weather channel. As shown in example content instantiation 700, the media application determines the weather forecast for today is a sporadic shower with light rain (e.g., 30%)

Figure 7B:
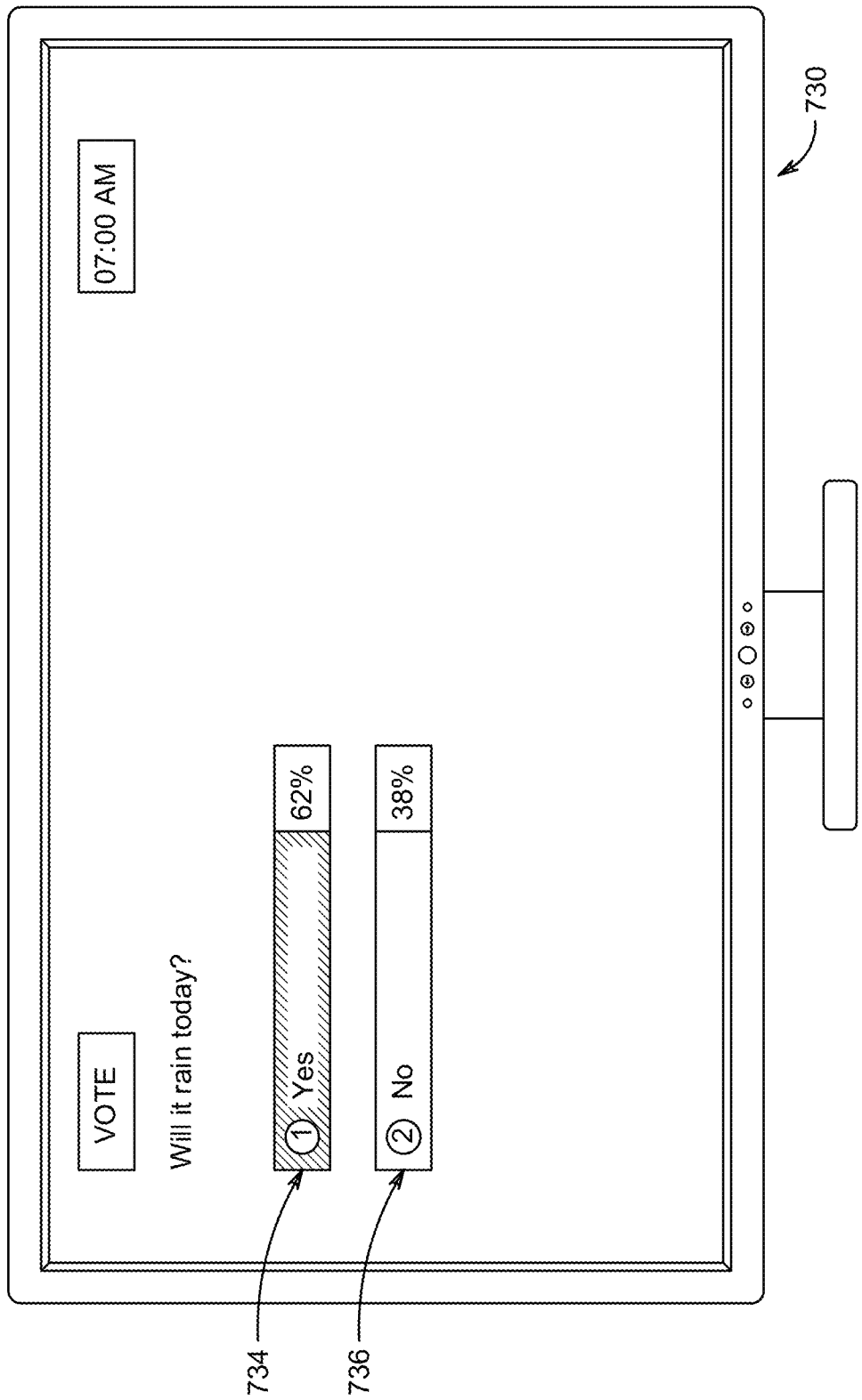

In some embodiments, the media application calculates a user confidence score based on data received via sensors and/or user input received via user interface. For example, as shown in FIG. 7B, the media application presents an opinion poll asking users 704 for their prediction on a weather condition. The media application determines that the answer to the question (e.g., "Will it rain today?") represents a user's perceived probability of an event (e.g., the likelihood of rain) and uses the poll response 734, 736 as a basis when calculating the user confidence score. The poll may be presented on a scale from zero to ten to measure an accurate user prediction. In FIG. 7B, users 704 answers the poll predicting that the likelihood of rain is high (e.g., 62%) despite the weather forecast of a sporadic shower, as shown in FIG. 7A. In some embodiments, a user confidence score may be determined based on user activity (e.g., a user checking the weather app every five minutes before going to work). As described above, a user confidence score may be calculated based on one or more factors, such as data received via sensors of a device, a poll response, or user activity, etc.

One exemplary formula in calculating a user confidence score is:

$$A \text{ user confidence score} = \alpha*(\text{user data}) + \beta*(\text{poll response}) + \gamma*(\text{user activity})$$

where $\alpha, \beta, \gamma$ are different constant

Taking the exemplary formula for a user confidence score, one exemplary calculation of a user confidence score is $=\alpha$ (e.g., 0.5)*(user data is 3 because the user has mentioned the "rain" three times in the last five minutes)+$\beta$ (e.g., 0.4)*(poll response is 0.62 because the user indicated in the likelihood of rain is 62%)+$\gamma$ (e.g., 0.3)*(user activity is 5 because the user has checked the weather app five times in the last hour). The media application may repeat the above calculation process at different times to get more data and train models to become more accurate in deducing the user's confidence score.

Figure 7C:
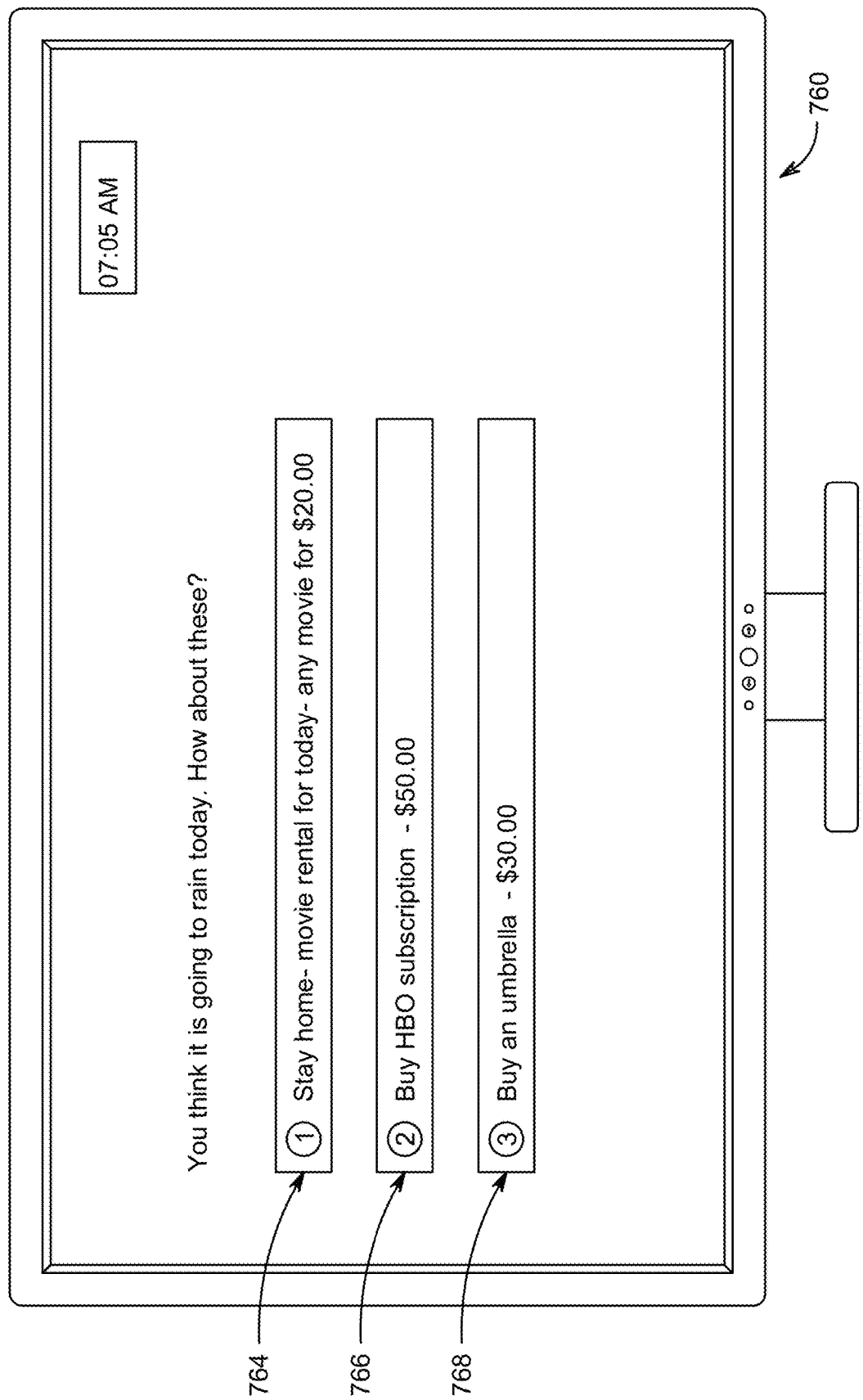

FIG. 7C shows an example user interface 760 that shows a recommended content item that is presented on a device, in accordance with some embodiments of the disclosure. For example, if the difference between the user confidence (e.g., high chance of rain) and the prediction score (e.g., low chance of rain) exceeds a certain threshold, the media application may offer one or more content items for a recommendation. The recommendation is based on the difference between what the system predicts and what the user perceives. As shown in exemplary user interface 760, the media application may offer a content item to watch at home (e.g., movie rental) 764 because the user may stay home thinking that it is going to rain. The media application may recommend an object (e.g., umbrella) related to the event (e.g., rain) for purchase 768. The media application may recommend a subscription to a media platform 766 because the user may stay home instead of leaving the house since the user's perceived probability of rain is high. In some embodiments, recommendations 764, 766, 768 are presented for a day because the media application may present a new poll the next day. Recommendations 764, 766, 768 may be presented while there is a difference in a user confidence score value and a prediction score value. Recommendations 764, 766, 768 may no longer be presented (e.g., after five hours) once the difference in values does not exceed a threshold value (e.g., the weather is getting better and the user no longer thinks it is going to rain).

Although the sporting event and the weather forecast were used as exemplary events, any event occurring in a content item may be used. For example, an event may be an incident that can have more than one outcome and an incident where there could be a difference in the system's prediction or human's prediction. In a related example, an event may be the likelihood of singer A coming to my hometown for a concert. If a user determines that the likelihood of singer A coming to my hometown for a concert is low (based on the human determination such as discussion with other fans), and the system determines that the likelihood is high (based on various factors about the singer or tour history of other similar singers), then the system may recommend goods related to the singer for the user to purchase in the expectation that the user will likely to consume the recommended content item.

FIG. 8 depicts an illustrative process 800 for providing content for a recommendation in accordance with some embodiments of the disclosure. The computing device can be any user television or gaming equipment 914a, user computer equipment 914b, or wireless user communications device 914c discussed above in relation to FIG. 9. It should be noted that process 800 may be performed by control circuitry 1002, 1010 of FIG. 10 as instructed by the media application that may be performed on any client device. In addition, one or more steps of flowchart 800 may be incorporated into or combined with one or more steps of any other processes or embodiments described in the present disclosure.

At step 802, control circuitry 1002 generates for output a first content item (e.g., soccer match between Manchester United vs. Tottenham or a weather forecast) on a computing device. At step 804, control circuitry 1002 receives user data via one or more sensors of the device while the first content item is being outputted. The user data may be analyzed to determine user's engagement level in the content item.

At step 806, control circuitry 1002 determines a user confidence score based on the user data and metadata of the first content item (e.g., whether the user is focused on watching the game and rooting for the team or a user has indicated in the poll that there is an 80 percent chance of rain today). A user confidence score indicates a user's perceived probability of an event occurring in the future (e.g., user's perception of the likelihood of the team Manchester United winning in the match or a chance of rain). At step 808, control circuitry 1002 calculates a prediction score that estimates the likelihood of the future occurrence of an event (e.g., the system determines that chance of winning for Manchester United is 80% or the system determines that it is expected to rain with a chance of 30%).

At step 810, control circuitry 1002 determines whether the difference between the user confidence score and the prediction score exceeds a threshold. If the difference is more than the threshold (e.g., 20%), control circuitry 100 selects a second content item related to the event at step 812 (e.g., more games of Manchester United games or binge-watching content for a rainy day). At step 814, control circuitry 1002 generates for output a recommendation comprising an identifier of the second content item.

If the difference is less than the threshold, control circuitry 100 selects a third content item related to the event at step 816 (e.g., a soccer match of different teams or an article about how to drive on a sunny day). The third content item may be different from the second content item. At step 818, control circuitry 1002 generates for output a recommendation comprising an identifier of the third content item.

Figure 9:
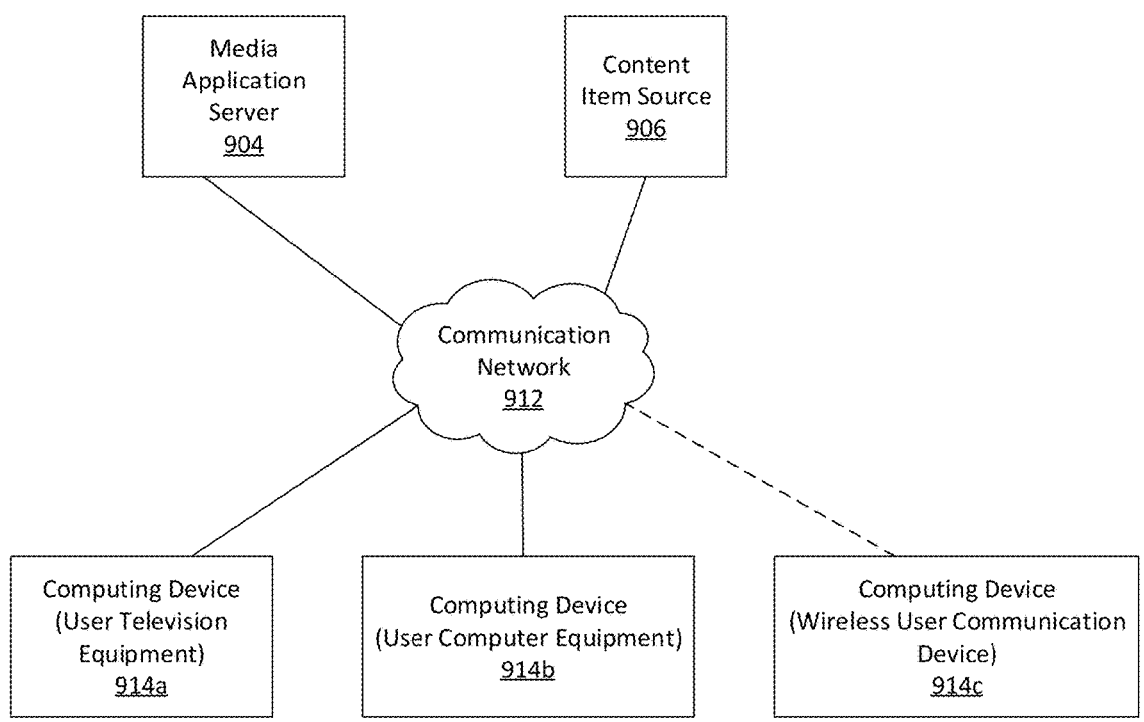
FIG. 9 shows an illustrative block diagram of a system for providing content recommendation, in accordance with some embodiments of the disclosure.

FIG. 9 shows an illustrative block diagram of a system 900 for providing content recommendation, in accordance with some embodiments of the disclosure. In one aspect, system 900 includes one or more media application servers 904, content item source 906, and communication network 912.

Communication network 912 may be one or more networks including the Internet, a mobile phone network, mobile voice or data network (e.g., a 5G or LTE network), cable network, public switched telephone network, or other types of communication network or combinations of communication networks. Communication network 912 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 912 communicatively couples various components of system 900 to one another. For instance, media application server 904 may be communicatively coupled to content item source 906 via communication network 912.

A video-hosting web server (not shown) hosts one or more video websites that enable users to download or stream videos, video clips, and/or other types of content. In addition to enabling users to download and view content, the video websites also provide access to data regarding downloaded content such as subtitles, closed caption data, metadata, or manifest.

Content item source 906 may store content item-related data from one or more types of content providers or originator of content (e.g., a television broadcaster, a Webcast provider, on-demand content provider, over-the-top content providers, or other providers of content). Content item source includes a content item, metadata associated with the content item, manifest associated with the content item, or any other related material associated with the content item. The manifest or metadata of the content item may include content-related information that may be retrieved from multiple sources. A remote media server may be used to store different types of content in a location remote from computing device 914 (described below). Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

In some embodiments, content item data from a video-hosting server may be provided to computing device 914 using a client/server approach. For example, computing device 914 may pull content item data from a server (e.g., media application server 904), or the server may push content item data to computing device 914. In some embodiments, a client application residing on computing device 914 may initiate sessions with content item source 906 for the content item data when needed.

Content and/or content item data delivered to computing device 914 may be over-the-top (OTT) content. OTT content delivery allows Internet-enabled user devices, such as computing device 914, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer I.P. packets provided by the OTT content provider. Examples of OTT content providers include YouTube™ or Netflix™ which provide audio and video via I.P. packets. YouTube™ is a trademark owned by Google Inc., Netflix™ is a trademark owned by Netflix Inc. OTT content providers may additionally or alternatively provide content item data described above. In addition to content and/or content item data, providers of OTT content can distribute applications (e.g., web-based applications or cloud-based applications), or the content can be displayed by applications stored on computing device 914.

As described in further detail below, media application server 904 accesses the content of the video website(s) hosted by a video-hosting web server (not shown) and, based on the data associated with accessed content, generates content recommendation.

System 900 also includes one or more computing devices 914, such as user television equipment 914a (e.g., a set-top box), user computer equipment 914b, and wireless user communication device 914c (e.g., a smartphone device or remote control), which users can use to interact with media application server 904, and/or content item source 906, via communication network 912, to search for desired content item content. For instance, in some aspects, media application server 904 may provide a user interface via computing device 914, by which a user can input a query for a particular item of content item content made available by content item source 906, and generate signs for the content item in response to the query by accessing and/or processing data, closed caption data, subtitles, manifest, and/or metadata. Although FIG. 9 shows one of each component, in various examples, system 900 may include multiples of one or more illustrated components.

Figure 10:
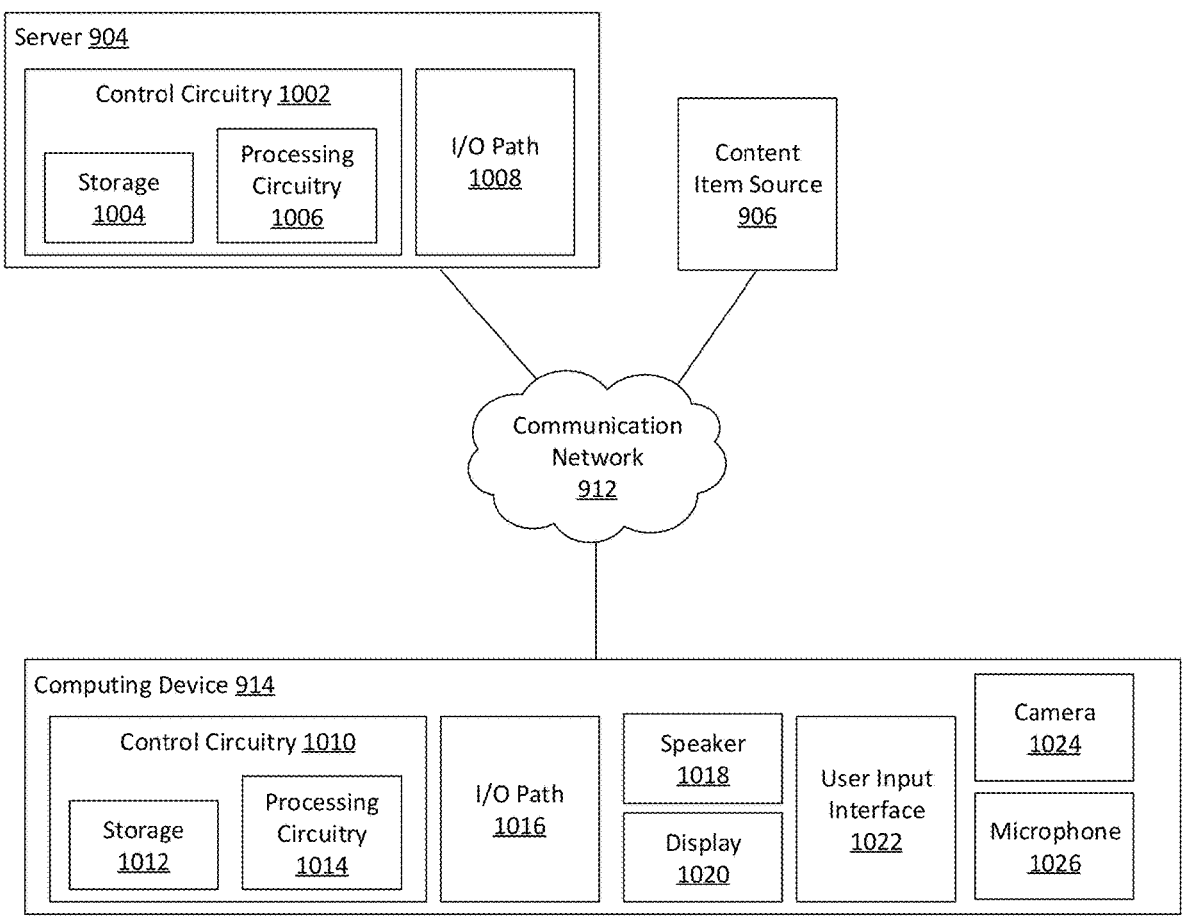
FIG. 10 is an illustrative block diagram showing additional details of the system of FIG. 9, in accordance with some embodiments of the disclosure.

FIG. 10 is an illustrative block diagram showing additional details of the system 900 of FIG. 9, in accordance with some embodiments of the disclosure. In particular, media application server 904 includes control circuitry 1002 and Input/Output (I/O) path 1008, and control circuitry 1002 includes storage 1004 and processing circuitry 1006. Computing device 914 includes control circuitry 1010, I/O path 1016, speaker 1018, display 1020, user input interface 1022, camera 1024, and microphone 1026. Control circuitry 1010 includes storage 1012 and processing circuitry 1014. Control circuitry 1002 and/or 1010 may be based on any suitable processing circuitry such as processing circuitry 1006 and/or 1014.

As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiples of the same type of processors (e.g., two Intel Core i9 processors) or multiples of different processors (e.g., an Intel Core i7 processor and an Intel Core i9 processor).

Each of storage 1004, storage 1012, and/or storages of other components of system 900 (e.g., storages of content item source 906, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (B.D.) recorders, BLU-RAY 3D disc recorders, digital video recorders (DVR, sometimes called a personal video recorder, or PVR), solid state devices, quantum storage devices, gaming consoles, gaming content item, or any other suitable fixed or removable storage devices, and/or any combination of the same. Each of storage 1004, storage 1012, and/or storages of other components of system 900 may be used to store various types of content, content item data, and or other types of data. Non-volatile memory may also be used (e.g., to launch a boot-up routine and other instructions). Cloud-based storage may be used to supplement storages 1004, 1012 or instead of storages 1004, 1012.

In some embodiments, control circuitry 1002 and/or 1010 executes instructions for an application stored in memory (e.g., storage 1004 and/or 1012). Specifically, control circuitry 1002 and/or 1010 may be instructed by the application to perform the functions discussed herein. For example, the application may be implemented as software or a set of executable instructions that may be stored in storage 1004 and/or 1012 and executed by control circuitry 1002 and/or 1010. In some embodiments, the application may be a client/server application where only a client application resides on computing device 914, and a server application resides on media application server 904.

The application (e.g., media application) may be implemented using any suitable architecture. For example, it may be a stand-alone application wholly implemented on computing device 914. For example, the media application may be implemented as software or a set of executable instructions, which may be stored in non-transitory storage 1004, 1012 and executed by control circuitry 1002, 1010. In such an approach, instructions for the application are stored locally (e.g., in storage 1012), and data for use by the application is downloaded on a periodic basis (e.g., from an out-of-band feed, from an Internet resource, or using another suitable approach). Control circuitry 1002, 1010 may retrieve instructions for the application from storage 1004, 1012 and process the instructions to perform the functionality described herein. Based on the processed instructions, control circuitry 1002, 1010 may determine what action to perform when input is received from user input interface 1022 of computing device 914.

In client/server-based embodiments, control circuitry 1002, 1010 may include communication circuitry suitable for communicating with an application server (e.g., media application server 904) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., communication network 912).

In another example of a client/server-based application, control circuitry 1002, 1010 runs a web browser that interprets web pages provided by a server (e.g., media application server 904). For example, the server may store the instructions for the application in a storage device. The remote server may process the stored instructions using circuitry (e.g., control circuitry 1002) and generate the displays discussed above and below. Computing device 914 may receive the displays generated by the remote server and may display the content of the displays locally via display 1020. This way, the processing of the instructions is performed remotely (e.g., by media application server 904) while the resulting displays are provided locally on computing device 914. Computing device 914 may receive inputs from the user via input interface 1022 and transmit those inputs to the server for processing and generating the corresponding displays.

A user may send instructions to control circuitry 1002 and/or 1010 received via user input interface 1022. User input interface 1022 may be any suitable user interface, such as a remote control, trackball, keypad, keyboard, touchscreen, touchpad, stylus input, joystick, voice recognition interface, or other user input interfaces. User input interface 1022 may be integrated with or combined with display 1020, which may be a monitor, a television, a liquid crystal display (LCD), an electronic ink display, or any other equipment suitable for displaying visual images.

A camera 1024 of computing device 914 may capture an image or a video. The image or video may be used in connection with a face detection algorithm to detect a face of the user. The image or video may be used in connection with a speech recognition algorithm to decipher a speech and determine an identity of the speaker. A microphone 1026 of computing device 914 may detect sound in proximity to computing device 914 and converts the sound to electrical signals. The detected sounds may be converted to text using voice-to-text techniques.

Media application server 904 and computing device 914 may receive content and data via I/O paths 1008 and 1016, respectively. I/O paths 1008, 1016 may provide content (e.g., broadcast programming, on-demand programming, Internet content, the content available over a local area network (LAN) or wide area network (WAN), and/or other content) and data to control circuitry 1002, 1010. Control circuitry 1002, 1010 may be used to send and receive commands, requests, and other suitable data using I/O paths 1008, 1016. I/O paths 1008, 1016 may connect control circuitry 1002, 1010 (and specifically processing circuitry 1006, 1014) to one or more communication paths (described below). I/O functions may be provided by one or more of these communication paths but are shown as single paths in FIG. 10 to avoid overcomplicating the drawing.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:
1. A method comprising:
generating for output a first content item on a device;
while the first content item is being outputted, receiving user data via one or more sensors of the device;

determining a user confidence score based on the user data and metadata of the first content item, the user confidence score indicating user's perceived probability of an event occurring in the future;

calculating a prediction score which estimates the likelihood of the event occurring in the future;

in response to determining that the difference between the user confidence score and the prediction score exceeds a threshold:

selecting a second content item related to the event; and generating for output a recommendation comprising an identifier of the second content item.

2. The method of claim 1, further comprising:

determining a user engagement score based on the user data received via one or more sensors, the user engagement score representing a degree of user engagement with the first content item.

3. The method of claim 1, wherein the first content is a depiction of a sport event, the method further comprising:

generating a probabilistic model that predicts the likelihood of a first team winning in the sport event based on training data, wherein the prediction score is trained based on the probabilistic model using one or more machine learning algorithms.

4. The method of claim 3, wherein the user's perceived probability of the event occurring in the future indicates a user's perceived winning chance of the first team over a second team in the sport event.

5. The method of claim 3, wherein the second content item comprises a depiction of an object related to the sport event.

6. The method of claim 3, wherein the selecting a second content item related to the event comprises:

accessing a database of content items comprising at least one of data related to the event, data related to the first team, or data related to the second team; and wherein selecting the second content item is based on data retrieved from the database of content items.

7. The method of claim 1, further comprising:

determining a time of when the user confidence score is determined;

wherein generating for output the recommendation is based on the determining that the time is within a threshold value.

8. The method of claim 1, further comprising:

in response to determining that the difference between the user confidence score and the prediction score does not exceed the threshold:

selecting a third content item different from the second content item; and generating for output a recommendation comprising an identifier of the third content item.

9. The method of claim 1, further comprising:

receiving user input selecting the identifier of the second content item; and presenting a first set of user-selectable options associated with the second content item for display.

10. The method of claim 1, further comprising:

without receiving user input selecting the identifier of the second content item, selecting a fourth content item different from the second content item; and generating for output a recommendation comprising an identifier of the fourth content item.

11. A system comprising:

control circuitry configured to:

generate for output a first content item on a device;

input/output circuitry configured to:

while the first content item is being outputted, receive user data via one or more sensors of the device;

wherein the control circuitry is further configured to:

determine a user confidence score based on the user data and metadata of the first content item, the user confidence score indicating user's perceived probability of an event occurring in the future;

calculate a prediction score which estimates the likelihood of the event occurring in the future;

in response to determining that the difference between the user confidence score and the prediction score exceeds a threshold:

select a second content item related to the event; and generate for output a recommendation comprising an identifier of the second content item.

12. The system of claim 11, wherein the control circuitry is further configured to:

determine a user engagement score based on the user data received via one or more sensors, the user engagement score representing a degree of user engagement with the first content item.

13. The system of claim 11, wherein the first content is a depiction of a sport event, wherein the control circuitry is configured to:

generate a probabilistic model that predicts the likelihood of a first team winning in the sport event based on training data, wherein the prediction score is trained based on the probabilistic model using one or more machine learning algorithms.

14. The system of claim 13, wherein the user's perceived probability of the event occurring in the future indicates a user's perceived winning chance of the first team over a second team in the sport event.

15. The system of claim 13, wherein the second content item comprises a depiction of an object related to the sport event.

16. The system of claim 13, wherein the control circuitry, when selecting a second content item related to the event, is configured to:

access a database of content items comprising at least one of data related to the event, data related to the first team, or data related to the second team; and wherein selecting the second content item is based on data retrieved from the database of content items.

17. The system of claim 11, wherein the control circuitry is further configured to:

determine a time of when the user confidence score is determined;

wherein generating for output the recommendation is based on the determining that the time is within a threshold value.

18. The system of claim 11, wherein the control circuitry is further configured to:

in response to determining that the difference between the user confidence score and the prediction score does not exceed the threshold:

select a third content item different from the second content item; and generate for output a recommendation comprising an identifier of the third content item.

19. The system of claim 11, wherein the control circuitry is further configured to:

receive user input selecting the identifier of the second content item; and present a first set of user-selectable options associated with the second content item for display.

20. The system of claim 11, wherein the control circuitry is further configured to:
  without receiving user input selecting the identifier of the second content item, select a fourth content item different from the second content item; and
  generate for output a recommendation comprising an identifier of the fourth content item.

\* \* \* \* \*